April 27, 1943.　　　A. L. LEE　　　2,317,623
VEHICLE DRIVE
Filed March 14, 1941　　　3 Sheets-Sheet 1
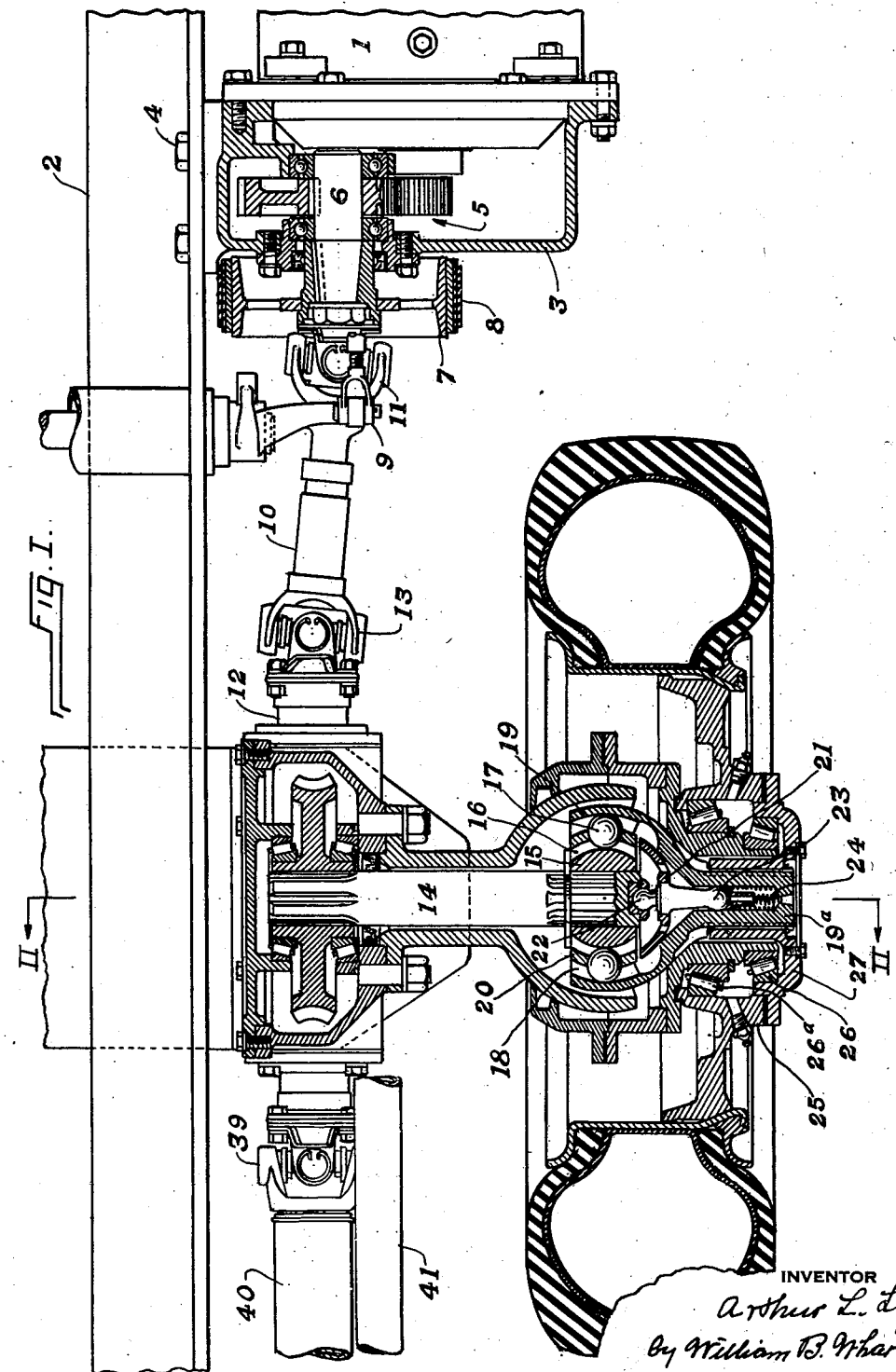
Fig. I.
INVENTOR
Arthur L. Lee
By William B. Wharton
his attorney

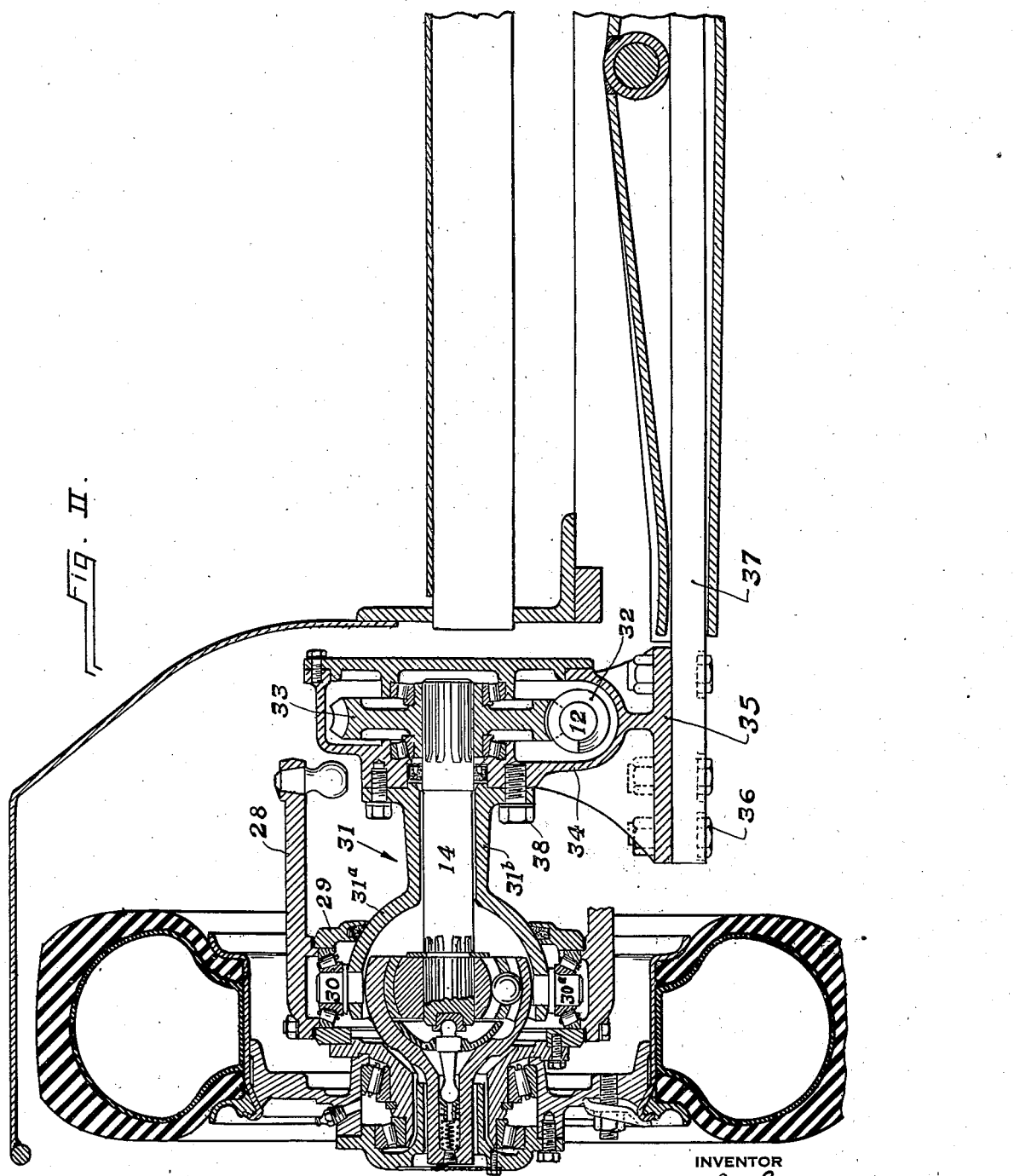

April 27, 1943.   A. L. LEE   2,317,623
VEHICLE DRIVE
Filed March 14, 1941   3 Sheets-Sheet 3
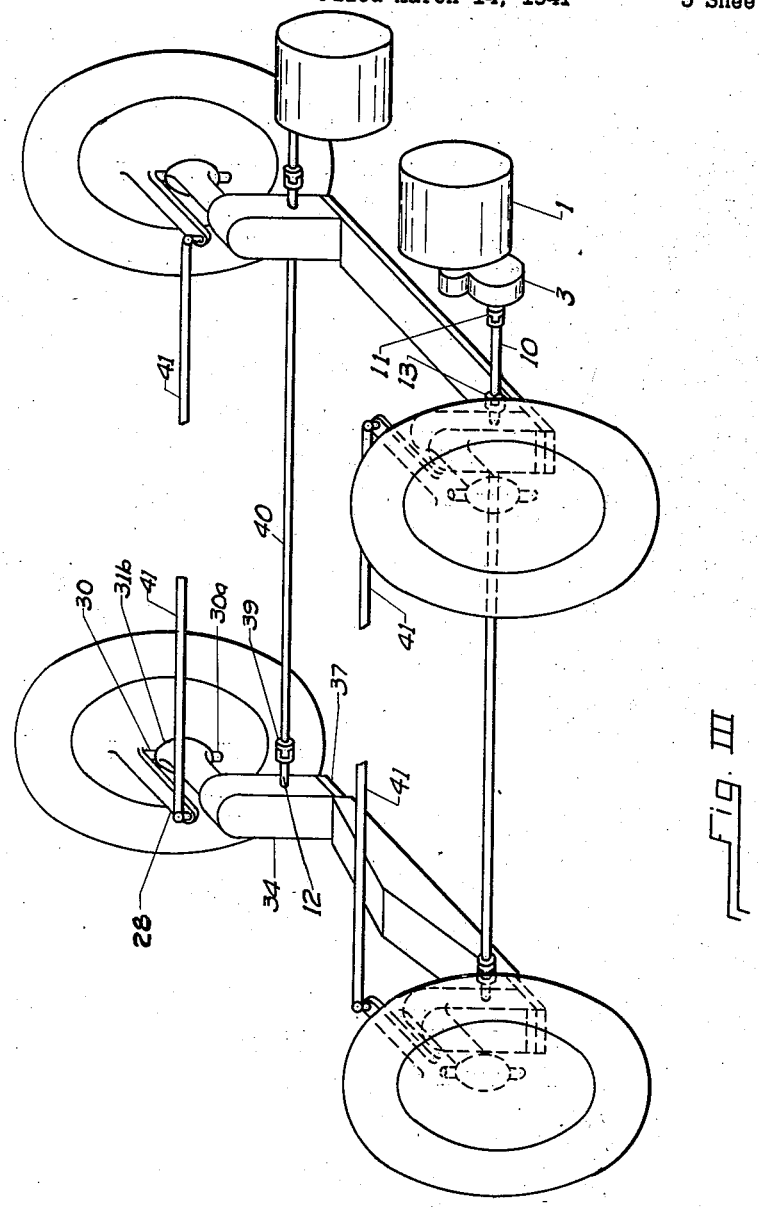
Fig. III
INVENTOR.
Arthur L. Lee
BY William B. Wharton
ATTORNEY Patented Apr. 27, 1943

2,317,623

UNITED STATES PATENT OFFICE 2,317,623

VEHICLE DRIVE

Arthur L. Lee, Oakmont, Pa., assignor, by mesne assignments, to Joy Manufacturing Company, Franklin, Pa., a corporation Application March 14, 1941, Serial No. 383,329

5 Claims. (Cl. 180—46)

This invention relates to a driving organization for automotive vehicles.

Certain automotive vehicles purposed to operate at low speed, and which carry heavy loads, are made with very little road clearance and are required to operate on a rough roadway. Of such vehicles, coal mine vehicles may be taken as typical, since in them, whether they be haulage vehicles or whether the load be integrated with the carrying elements of the vehicle as in wheel-mounted mining machines and loading machines, the vehicles are operated at low speed and have a minimum of road clearance. Also at low speed the driving connections must be such as to deliver high tractive force and must be sturdy in structure. In this connection it may be noted that in coal mines the use of gasoline motors is not permitted, and electrical motors being used, low speed of vehicle travel is enforced, and the provision of efficient driving connections becomes a matter of particularly great importance.

In attaining these desired properties in a drive for vehicles of the sort specifically designated, and in vehicles of other sorts in connection with which like problems exist, a desirable form of drive for such slow-moving vehicles is a shaft and worm power-delivery organization from the electrical motor, or motors, of the vehicle to the vehicle wheels.

An object of my invention is to accommodate a shaft and worm drive from the source of motive power to a wheel, or wheels, on both sides of the vehicle, to deliver driving power to the wheels by a driving organization placed along the sides of the vehicle and above the lowermost level of the vehicle without connection across the vehicle.

Another object of my invention is to provide a driving organization, placed as above noted along the sides of the vehicle and without connection across the vehicle, which is adapted directly to drive both wheels on both sides of the vehicle.

Another object of my invention is to provide along the sides of the vehicle driving connections so organized, and so associated with wheels of suitable sort; that the driving connections present no obstruction to simultaneous steering movement of the wheels on each side of the vehicle which the driving connections operatively interconnect.

In the accompanying drawings Fig. I is a horizontal sectional view through the driving organization of my invention, showing such driving organization, or power-transmission, mounted on the structure at one side thereof the wheel being a rear wheel of the vehicle.

Fig. II is a vertical sectional view taken in the central plane of the front wheel on the same side of the vehicle as the rear wheel of Figure I, showing in vertical section structure identical with that of the said rear wheel, and showing fragmentarily mounting structure of the vehicle in which the power transmission is included, additional to the mounting structure shown in Fig. I.

Fig. III is an isometric schematic view illustrating an arrangement of vehicle wheels and the motors and power transmission systems for driving the said wheels.

Referring generally to both figures of the drawings, the vehicle in which the power transmission of my invention is shown as included in a coal mine shuttle car, such as is shown and described in my companion application Serial No. 383,331, filed March 14, 1941, for an improvement in Mine vehicle. Fig. II of the drawings illustrates the mounting of the wheels and their associated power-transmitting mechanism within wheel pockets provided in the body structure of the vehicle, and Fig. I illustrates the arrangement of the power-transmission longitudinally along the sides of the vehicle.

Referring particularly to Fig. I of the drawings, a motor, the housing 1 of which is fragmentarily shown, is mounted to a longitudinal frame member 2 of the vehicle by being bolted to a gear case 3, which in turn is secured by bolts 4 to the longitudinal frame member. It is to be understood that in the organization of the vehicle assembly a motor which, in the case of coal mine vehicles is an electrical motor, is identically mounted on both sides of the vehicle, and that identical power transmission is provided. As shown in Fig. I, gear case 3 contains a speed-reducing gear train, designated generally by reference numeral 5, which drives a shaft element 6. A brake drum 7 is keyed to shaft element 6 and cooperates with brake bands 8. The proximate elements of brake-operating means are shown at 9. A drive shaft 10 connected with shaft element 6 by a universal joint 11 and connected with worm shaft 12 by universal joint 13 transmits driving power from the reduction gearing 5 to the region of power delivery to a driving wheel.

The wheel shown herein is of itself previously known and does not of itself form part of my invention. It is, however, of a sort suitable for many purposes and is connected in novel manner with the elements of the power transmission which extend longitudinally along the sides of the vehicle, and part of which power transmission has been above described.

The wheel structure herein shown includes a shaft 14 which receives driving power from the longitudinal power transmitting connections of the assembly as will be hereinafter explained, and to which there is splined a spherical element 15 having therein ball grooves 16 in which ride balls 17. Balls 17 ride also in ball grooves 18 in a spherical driving element 19 for the wheel. A cage element 20 between spherical elements 15 and 19 confines the balls 17 and is held in place by a control assembly composed of guide element 21, pilot center 22, and pilot 23 which is maintained under the pressure of spring 24. A rotor member 25 carrying the wheel rim and tire rides on bearings 26, 26a. A driving structure 27 is secured to the rotor member 25, and is splined to stem 19a of spherical driving element 19.

Driving power being transmitted from shaft 14 to driving structure 27 and the rotor member 25, these latter have rotational movement about the steering spindles of the wheel. Power is transmitted through balls 17 in various positions of driving structure 27 and rotor member 25. Steering is effected by a steering arm 28, which is integrated with a sealed housing 29, and turns about spindles 30 and 30a which are mounted in the spherical portion 31a of a housing 31.

Housing 31 including its spherical portion 31a, together with the power shaft 14, form the elements of a novel connection with the longitudinally extended power transmission of my driving assembly, by which connection the jointed wheel above described is assimilated in the driving assembly. Returning to worm shaft 12, which delivers driving power from a motor to a region adjacent the wheel, this shaft carries a worm 32 meshing with a worm gear 33 in worm housing 34. This worm housing is carried by a base 35, secured by bolts 36 to a cross beam 37 forming a primary element of the vehicle mounting structure. This cross beam 37, and the structure with which it is associated, form the subject matter of my companion application Serial No. 383,330, filed March 14, 1941, on an improvement in Vehicle mounting structure. Possibly, though less desirably, worm housing 34 may be secured to the longitudinal frame structure of the vehicle.

As shown in both Figs. I and II, worm gear 33 has a spline connection with the driving shaft 14 for the wheel, and thus delivers power to the wheel in a right angular direction to the line of power transmission extending longitudinally along, and outside of, the frame and body structure of the vehicle. Housing 31, referred to above, has a flanged tubular portion 31b secured to the worm housing 34 by bolts 38. Outwardly, housing 31 has the spherical portion 31a, which lies around the power-transmitting elements of the wheel and provides mounting for the spindle elements 30 and 30a about which the wheel turns in its steered movement. As above noted, the power-transmitting elements of the wheel give the effect of a universal joint, permitting the wheel to be driven and steered simultaneously about the fixed shaft 14 and the fixed housing 31. The connection of a wheel of unuiversal type to the longitudinal power transmission elements, by means of the rigid shaft 14 and the rigid housing 31, gives all the advantageous effects normally obtained by shaft and worm drives while accommodating such drive to the exacting space conditions existing in vehicles having a minimum of road clearance and requiring a maximum of body capacity, such as the vehicle fragmentarily illustrated in Fig. II of the drawings; which vehicle, as above explained, is the Mine vehicle of my companion application Serial No. 383,331, filed March 14, 1941.

Referring particularly to Fig. I of the drawings, it will be seen that worm shaft 12 is connected by universal coupling 39 with a shaft 40 extended longitudinally of the vehicle beyond worm housing 33. The shaft thus indicated is a power-transmission shaft to a second worm, worm gear, and wheel organization, duplicating the organization shown in the drawings. By extending the shaft connection in this manner, both wheels on each side of the vehicle may be positively driven by a transmission assembly which is adapted to the free simultaneous steering of both such wheels. This steering may be effected as in my companion application above referred to by steering connections extended longitudinally of the vehicle, one of such steering connections 41 being fragmentarily indicated in Fig. I of the drawings. It may be further noted that the use of power-transmiting shafts connected in the power-transmission assembly by universal couplings, makes it unnecessary to employ great accuracy in the mounting of the gear casings in the assembly; and accommodates a power transmission along the sides of the vehicle to flexibility and shock absorbing properties in the mounting structure of the vehicle.

I claim as my invention:

1. In a drive for slow-moving vehicles the combination of wheel mounting structure attached exteriorly of the frame of a vehicle, a power delivery shaft having a fixed mounting exteriorly of the said frame of the vehicle and extended outwardly therefrom, a wheel having spindle mounting in the said wheel-mounting structure, connections internally of the said wheel actuated by the said power-delivery shaft and arranged to function in different steered positions of the wheel in its spindle mounting, a motor, and a power-transmission assembly extended from the said motor longitudinally along and outwardly of the frame of the vehicle to connection with the said power-delivery shaft.

2. In a drive for slow-moving vehicles having low road clearance, the combination of a power-delivery shaft extended outwardly from the vehicle, means supporting the said shaft in fixed angular relation to the vehicle, a wheel spindle-mounted for steering, a flexible driving connection between the power-delivery shaft and the wheel, a transmission shaft extended longitudinally of the vehicle between the said flexible connection and the vehicle frame, means rotatably mounting the said transmission shaft in substantially fixed parallel relation to the longitudinal axis of the vehicle, and gearing connecting the said transmission and power-delivery shafts.

3. In a drive for slow-moving vehicles having low road clearance, the combination of a plurality of power-delivery shafts extended outwardly from the same side of the vehicle, means supporting each of the said shafts in fixed angular relation to the vehicle, a wheel spindle-mounted adjacent each shaft, universal driving connections between the respective wheels and shafts, and a common transmission shaft extended longitudinally of the vehicle between the vehicle frame and the said universal connections, means rotatably mounting the said transmission shaft on the vehicle in substantially fixed relation to the longitudinal axis of the vehicle, and gearing connecting each of the said power-delivery shafts with the transmission shaft.

4. The combination with a vehicle having a plurality of supporting wheels at one side of its body, and means mounting the wheels for turning about substantially vertical axes spaced from said side whereby the wheels can be steered, of common drive shaft means extending along said side adjacent the wheels and inwardly of said vertical axes, means rotatably supporting said shaft means in fixed relation to said body, means including universal driving connections operatively connecting said shaft means to the adjacent wheels regardless of the steered position of the wheels, and a motor operatively connected to one end of the drive shaft means beyond the wheels for driving the wheels in tandem.

5. In a drive for slow-moving vehicles having low road clearance, the combination of a housing projecting outwardly from the side of the vehicle in fixed angular relation thereto, a power-delivery shaft journaled in the housing, a wheel mounted on the outer end of the housing for turning on a substantially vertical axis for steering, a universal driving connection between the outer end of said shaft and the wheel, a worm gear mounted on the inner end of the shaft, a power transmission shaft extending along the side of the vehicle adjacent said gear, means rotatably supporting said transmission shaft in fixed relation to the vehicle, a worm mounted on the transmission shaft and meshing with said gear, and means for driving the transmission shaft.

ARTHUR L. LEE.